United States Patent [19]
Mahon

[11] 3,824,853
[45] July 23, 1974

[54] AIRCRAFT INSTRUMENT SHROUD
[75] Inventor: Roger Mahon, New Brunswick, N.J.
[73] Assignee: American Standard Inc., New York, N.Y.
[22] Filed: Aug. 13, 1970
[21] Appl. No.: 63,514

[52] U.S. Cl. .................................. 73/181, 73/194 B
[51] Int. Cl. ........................... G01p 5/00, G01f 1/00
[58] Field of Search ............ 73/178, 179, 182, 212, 73/181, 183, 186, 187; 244/1 R

[56] References Cited
UNITED STATES PATENTS

| | | | |
|---|---|---|---|
| 1,935,445 | 11/1933 | Heinz................................. | 73/181 X |
| 2,536,037 | 1/1951 | Ilousing et al. ................... | 73/204 X |
| 2,590,521 | 3/1952 | Dyche, Jr.......................... | 73/212 X |
| 2,876,640 | 3/1959 | Beach, Jr. et al................. | 73/212 X |
| 3,116,639 | 1/1964 | Bird ................................... | 73/194 |
| 3,149,491 | 9/1964 | Sissenwine et al................ | 73/182 X |
| 3,374,673 | 3/1968 | Trageser .......................... | 73/202 X |

Primary Examiner—Herbert Goldstein
Attorney, Agent, or Firm—Robert G. Crooks; Tennes I. Erstad

[57] ABSTRACT

The angle of attack effects on the primary sensing element of an aircraft altitude/airspeed measuring instrument are minimized and controlled by means of a shroud device having a particular inlet shape which surrounds and isolates such sensing element. The primary element includes an upstream cylindrical member and a downstream disc-like member spaced from the cylindrical member by a predetermined distance. Fluid parameter fluctuations are produced in the airstream behind the cylinder-disc structure which are directly related to true airspeed. The measured fluctuation frequency, however, is also influenced by the angle of attack of the aircraft. This latter effect constitutes a source of instrument error which the shroud device minimizes and controls.

2 Claims, 8 Drawing Figures

3,824,853

INVENTOR.
Roger F. Mahon
BY Sheldon H. Parker
ATTORNEY

AIRCRAFT INSTRUMENT SHROUD

BACKGROUND OF THE INVENTION

1. Field of the Invention

The invention relates generally to an aircraft altitude/airspeed sensor and, more particularly, to controlling angle of attack effects on the sensor by an improved shroud device.

2. Description of the Prior Art

In an article published in November 1965 at page 350 of the Aeronautical Quarterly, W. A. Mair describes experiments in which a flat disc was attached to the downstream, flat-based end of a curved-nose circular cylindrical body for the purpose of reducing the body drag when the assembly was placed in a relatively low speed wind tunnel. Mair reported that the drag could be increased or decreased depending on the axial spacing of the disc from the cylindrical body. In the high drag region, Mair also reported observing the fluid flow in the cavity between the base of the body and the disc to be severely unsteady and characterized by a signal having a predominant frequency for a given value of air stream velocity.

In studying Mair's work, it was postulated that the basic assembly of the cylindrical body and appended downstream disc could possibly be used as an airspeed indicator by measuring the frequency of the unsteady flow observed by Mair and correlating the frequency to the velocity of the flowing fluid. In exploring this concept, an apparatus similar to that used by Mair was constructed and, with the apparatus placed concentrically in a pipe and its nose pointed upstream, measurements were made upon the characteristics of the so-called unsteady flow observed by Mair. In general, these investigations confirmed Mair's report of an unsteady oscillatory-type flow generated in the vicinity and downstream of the cavity between the base of the body and the appended disc. However, it was also learned that the signal detected was not stable inasmuch as the frequency and amplitude of the oscillations detected at various velocities of fluid flow could not always be measured and, in general, could not be accurately correlated to the fluid flow velocity. In other words, there were too many unpredictable variations in the Strouhal number over a considerable range of Reynolds numbers and consequently, measurement of the oscillatory flow could not be practically utilized for adaption of the apparatus as an airspeed indicator.

It has since been discovered that the structure proposed by W. A. Mair can be modified so as to make it capable of generating stabilized oscillations in the downstream wake which are not subject to the random fluctuations of the unmodified apparatus as discussed in pending application Ser. No. 705,061 by White. More specifically, it has been found that modification of the apparatus by an additional structural element which splits or obstructs the fluid flow stream at a point adjacent to or downstream of the cavity between the base of the cylindrical body and the disc stabilizes the oscillations in the downstream wake by causing the oscillatory fluid flow to maintain itself in a plane which is fixed in angular position relative to the central longitudinal axis of the apparatus. This eliminates the random variations previously mentioned, so that the oscillatory flow pattern can be easily and reproducibly measured for a given velocity of fluid flow. Moreover, the Strouhal number for the stabilized oscillatory flow has been found to be substantially constant over a considerable range of Reynolds numbers. Thus, in the stabilized oscillatory flow produced, the frequency of oscillation is directly proportional to the fluid flow velocity over a substantial range of velocities and therefore, the modified apparatus has excellent utility as an airspeed indicator.

It provides the advantages of simplicity, linearity, a digital output, no-moving parts and very little pressure drop in the mean axial flow of the fluid moving by the relatively small obstruction that is constituted by the modified apparatus.

Additionally, the device has been shown to have excellent utility as an aircraft altimeter. The total pressure of the surrounding airstream, which is composed of a velocity pressure and a static pressure, can be accurately measured by means of a commercially available pitot tube. Such velocity pressure is a function of the velocity of the flowing fluid which is determined with great accuracy by measuring the frequency of oscillations generated by the cylinder-disc device. Once the above quantities have been ascertained, one can calculate the static pressure by subtracting the velocity pressure from the total pressure. Altitude is a function of static pressure and can readily be determined by reference to standard conversion tables or computed by an air data computer according to standard formulas well known to those versed in the art.

The above altimeter/airspeed instrument provides the advantage of being appreciably less sensitive to calibration changes caused by particle erosion and stress induced fuselage deformations than presently available devices.

The device, however, exhibits some sensitivity to angle of attack effects in that, at a fixed airspeed, the frequency emitted from the cylinder-disc increases somewhat with increasing angles of attack. It is the ultimate objective of any instrument to respond only to the parameter to be measured, e.g., airspeed and to no others and the instant invention is directed towards that end.

Kiel probes have been employed in total pressure measurements to reduce the sensitivity of standard pitot tube devices to similar angular flow effects. Such probes incorporate an open-ended cylindrical shield which envelops the pitot tube head as illustrated and described on page 14–8 of the Handbook of Fluid Mechanics by V. L. Streeter, published by McGraw-Hill. When this technique was applied to the cylinder-disc meter, it helped somewhat in reducing such sensitivity, but not to the extent that would be required for commercial aircraft, i.e., the frequency output was still influenced by the sensor's orientation when the angles of attack were greater than ± 10°.

BRIEF SUMMARY OF THE INVENTION

It has now been determined that angle of attack effects on the primary sensing element of an aircraft altitude/airspeed measuring device can be minimized and controlled by an improved shroud with a particular inlet geometry which is asymetrical in operation in that it renders the sensor less sensitive in one direction (e.g., positive angles of attack) than in another direction (e.g. negative angles of attack). In accordance with the principles of the present invention, such results are accomplished by means of a shroud device having an angled inlet section and an outlet section which envelops the cylinder-disc sensor.

BRIEF DESCRIPTION OF THE DRAWINGS

The objects and advantages of the invention will become apparent and the invention will be readily understood by reference to the following detailed description taken in conjunction with the accompanying drawings, wherein.

DETAILED DESCRIPTION OF THE INVENTION

Figure 1:
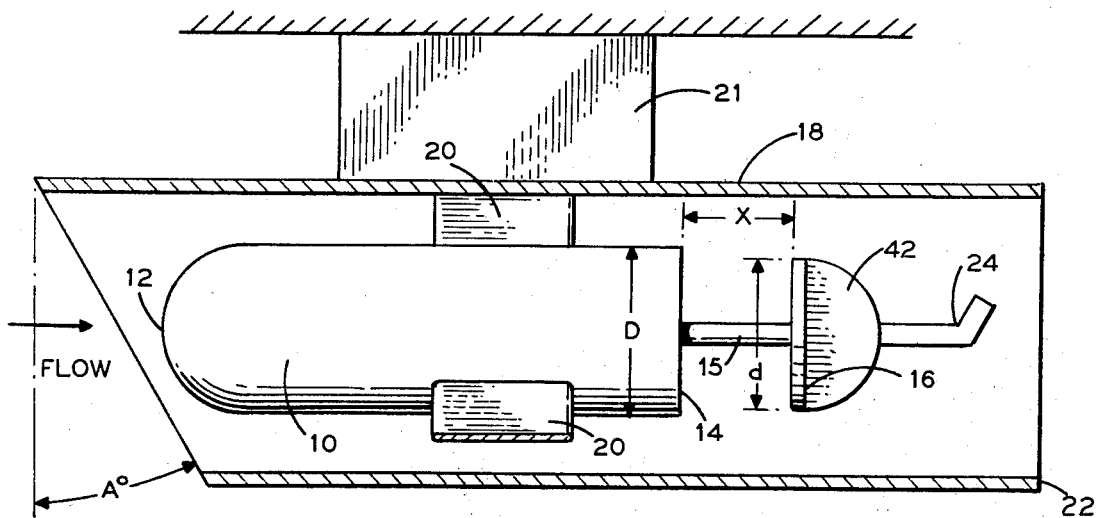
FIG. 1 is a fragmentary side elevational view, partly in cross-section, of the altitude/airspeed sensor and shroud device in accordance with the principles of the invention.

Referring to FIG. 1, the structural relation between the various elements are shown in accordance with the principles of the instant invention.

A cylindrical body 10 has a curved nose 12 which can be either blunt as illustrated or pointed, and a flat base 14 at its opposite end. Attached to the base 14 is a flat disc 16 of smaller diameter $d$ as compared to the diameter D of the cylindrical body 10. The center of the disc is coincident with the longitudinal central axis of the body 10 and is spaced axially from the base 14 by the distance $x$.

The body 10 and attached disc 16 are suspended at the center of the shroud 18 by three thin vanes 20 connecting the exterior surface of the body 10 to the interior wall of the shroud 18. The dimensions of the vanes are not narrowly critical and are primarily dimensioned so as to minimize their flow obstruction while still providing the requisite structural strength.

The shroud 18 is shaped to provide an inlet that is angled a predetermined amount, A° and is secured to the fuselage of an airplane by means of a single vane 21. The shroud should be spaced a sufficient distance from the surface of the fuselage such that it is beyond the boundary layer or other influence of the airplane. Typically, a distance of approximately three inches will provide the desired result. The altitude/airspeed sensor can be located on the aircraft at any convenient position.

As illustrated, the nose 12 faces a source of fluid flow and is pointed upstream with respect to the fluid flow and the disc 16 is pointed downstream facing the exit end 22 of the shroud 18, with the longitudinal axis of the body 10 substantially parallel to the mean axial fluid flow within shroud 18.

Positioned on the stabilizer vane 42, is an oscillation responsive to sensitive element 24. For example, a variety of temperature, pressure of velocity responsive devices such as a diaphragm transducer or a piezoelectrical crystal for sensing pressure changes, or a self-heated thermistor or thermocouple for sensing velocity changes can be used.

The element 24 can be mounted at a variety of positions, as for example on the cylinder 10, at or near the flat base 14 or any portion of the disc 16, stabilizer 42 or on the shroud 18, downstream of the flat base portion 14 of the cylinder 10.

The signal from the responsive device 24 is fed to signal conditioning equipment whose purpose is to transform the sensed fluid oscillations into an electrical waveform suitable as input to an air data computer and/or any other readout devices which may be appropriately used on the aircraft.

Figure 2:
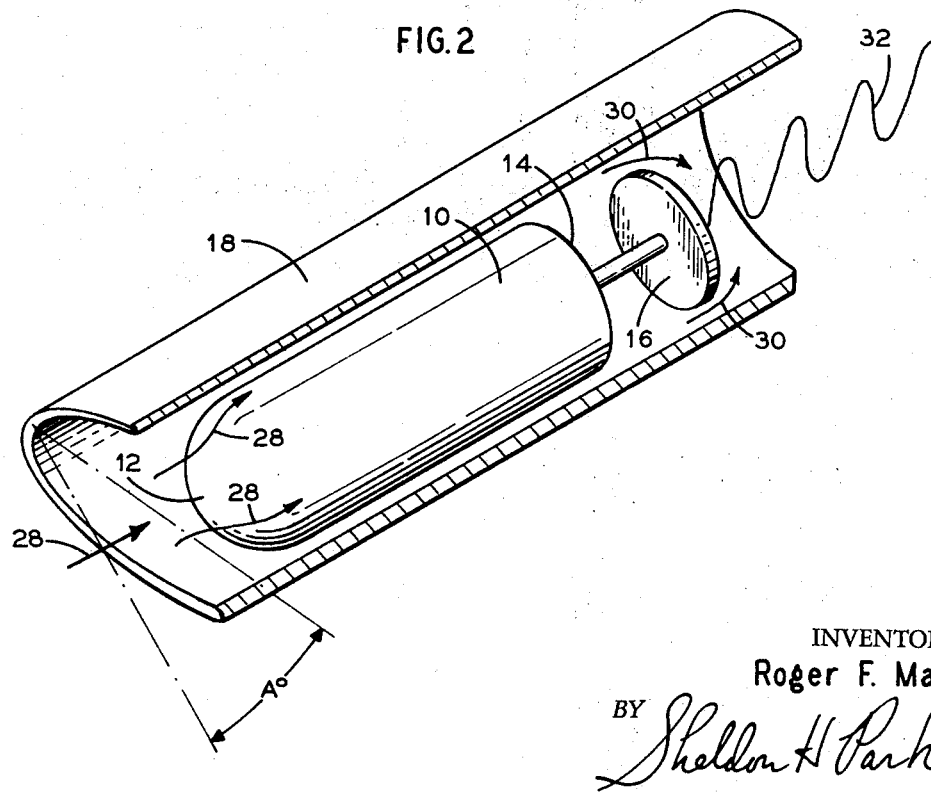
FIG. 2 is a perspective view, partially in section, of the cylindrical portion, disc portion and shroud portion of the structure of FIG. 1.

Referring now to FIG. 2, when a fluid such as air flows into the shroud 18, the flow impinges upon the curved nose 12 of the body 10 and divides as shown by the arrows 28 to flow around and by the obstruction constituted by the body 10. When the fluid flow reaches the space between the disc 16 and flat base 14, it is disrupted or perturbed and as a result a downstream wake is generated in which the fluid flow traces an oscillatory motion as indicated by the arrows 30 and trace line 32. Such oscillatory flow is stabilized in a fixed plane by means of the stabilizer vane 42 which is illustrated in FIG. 1.

Figure 3A:
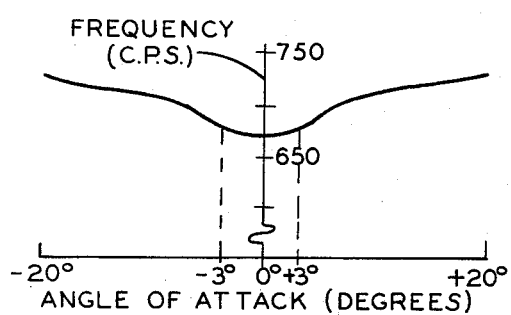
FIGS. 3 a and 3 b illustrate the plot of angle of attack vs. frequency for an unshrouded body.
Figure 3B:
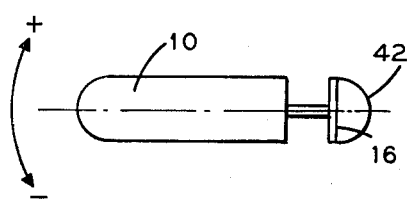

Referring now to FIG. 3a, there is illustrated a plot of angle of attack vs. frequency at a constant air speed for an unshrouded sensor as shown in FIG. 3b. An examination of the curve of FIG. 3a will reveal that there is a significant change of frequency for angles of attack greater than plus or minus 3°. The frequency emitted from the altitude/airspeed sensor, however, should only be a function of true airspeed and to the extent that it also responds to changes in angle of attack, it is inaccurate. Such a sensor, therefore, would have only limited utility, i.e. when the aircraft was within the 3° band and typically, deviations in excess of this occur primarily during take-off and landing when altitude/airspeed indications are most critically required to be accurate.

Figure 4A:
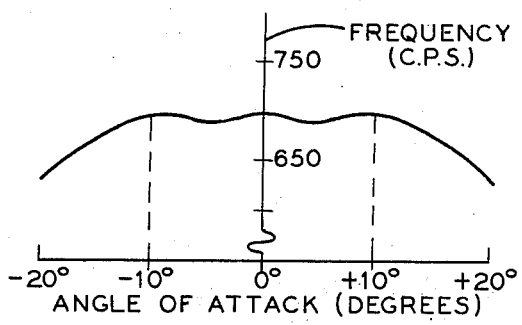
FIGS. 4 a and 4 b illustrate the plot of angle of attack vs. frequency for a shrouded body where the shroud has an inlet perpendicular to its longitudinal axis.
Figure 4B:
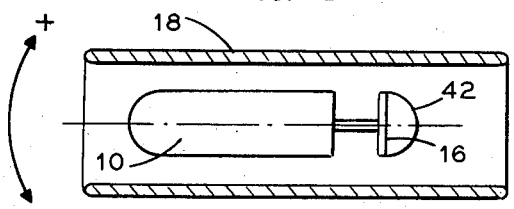

FIG. 4a illustrates a plot of angle of attack vs. frequency at a constant airspeed for a shrouded sensor having a straight inlet perpendicular to the longitudinal axis of the shroud as illustrated in FIG. 4b. An examination of this curve will reveal that there is minimal change in frequency for angles of attack of up to plus or minus 10°. To this extent, the plain shroud has extended the operational utility of the sensor, but still not sufficiently for general commercial application.

Commercial aircraft generally experience much greater positive angles of attack than negative angles: +25° maximum during the take-off climb and only −2° maximum during landing would be representative. As such, it would be acceptable for a sensor to be biased in such a way that it could tolerate greater positive angles of attack even if some insensitivity to negative angles had to be sacrificed to accomplish this.

It was hypothesized that if the two effects illustrated in FIG. 3 and FIG. 4 could be combined in some way, i.e., the tendency for the frequency of the unshrouded device to increase and the tendency of the shrouded device to drop off, one might achieve a relatively "flat" frequency curve for angle of attack changes. FIG. 5b illustrates the geometry which was devised to accomplish the above by establishing a bias in favor of positive angles. The shroud was modified with a particular inlet angle A such that the intake flow was not drastically reduced or "choked" with increasing positive angles of attack as was the case with the device of FIG. 4. It still restricted the flow sufficiently, however, to control the natural tendency of the unshrouded sensor to increase in frequency with increasing angles as frequency is directly related to such intake flow.

Figure 5A:
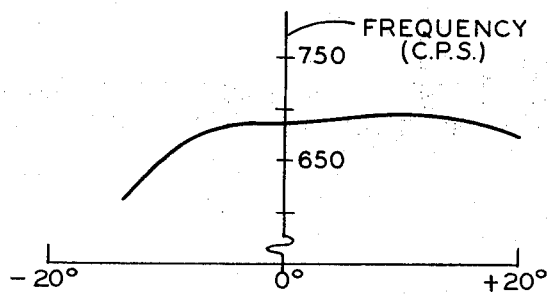
FIGS. 5 a and 5 b illustrate the plot of angle of attack vs. frequency for a shrouded body where the shroud has an angled inlet.
Figure 5B:
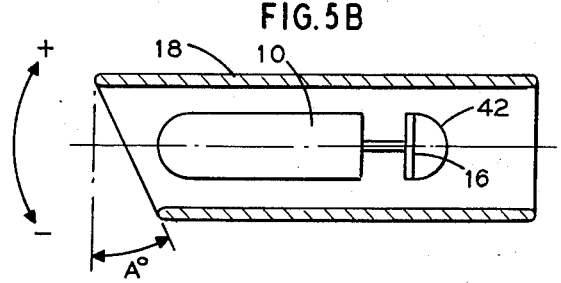

FIG. 5a illustrates a representative plot of angle of attack vs. frequency at a constant airspeed for the modified shroud with fixed inlet angle A. It shows a flatter frequency response for increasing positive angles but falls off more quickly for the less critical negative angles. The larger the inclined angle, the larger the positive bias. Various tests have shown that the angle A can be as large as 30° and still provide acceptable results. It was originally anticipated that such an oblique inlet would seriously disrupt the intake flow and, hence, interfere with the requisite flow pattern required for the generation of the oscillatory wake. Fortunately, however, this did not prove to be the case and signals of excellent quality were obtained even at substantial angle of attack positions.

In addition to the above function, the modified device has several other advantages. It serves to isolate the oscillatory flow from other flow disturbances which might cause spurious frequency readings. Secondly, the design is still simple enough to geometry that it can readily be deiced. Thirdly, the device has a low pressure loss and, hence, will not be a source of significant parasitic drag on the aircraft.

Obviously many modifications and variations of the present invention are possible in the light of the above teachings. Such variations might include the substitution of other vortex shedding devices whose shedding frequency is also directly related to airspeed for the cylinder-disc configuration. Examples of some alternative devices are shown in U.S. Pat. No. 3,116,639 by Bird.

What is claimed is:

1. An airfoil speed measuring device comprising a flow tube constructed and arranged so that flow rate through the tube has a known proportionality to flow rate outside the tube when the airfoil has a zero attack angle; and sensing means within the tube acting to produce a signal related to the tube flow rate; the tube having its inlet nose constructed to admit substantially the same air mass over an appreciable range of attack angles, to maintain the aforementioned proportionality; the tube flow cross section is substantially constant from the inlet nose to at least the sensing means, the inlet nose being angled to the tube axis so that the inlet area is appreciably larger than the tube cross section.

2. The device of claim 1 wherein the inlet nose is angled downwardly and rearwardly so that the proportionality is maintained over a range of positive attack angles.

* * * * *